Dec. 28, 1943. F. W. SCHEINEMAN 2,337,684
SYSTEM FOR RECOVERING FINELY DIVIDED SOLIDS FROM GASES
Filed April 24, 1941 3 Sheets-Sheet 1
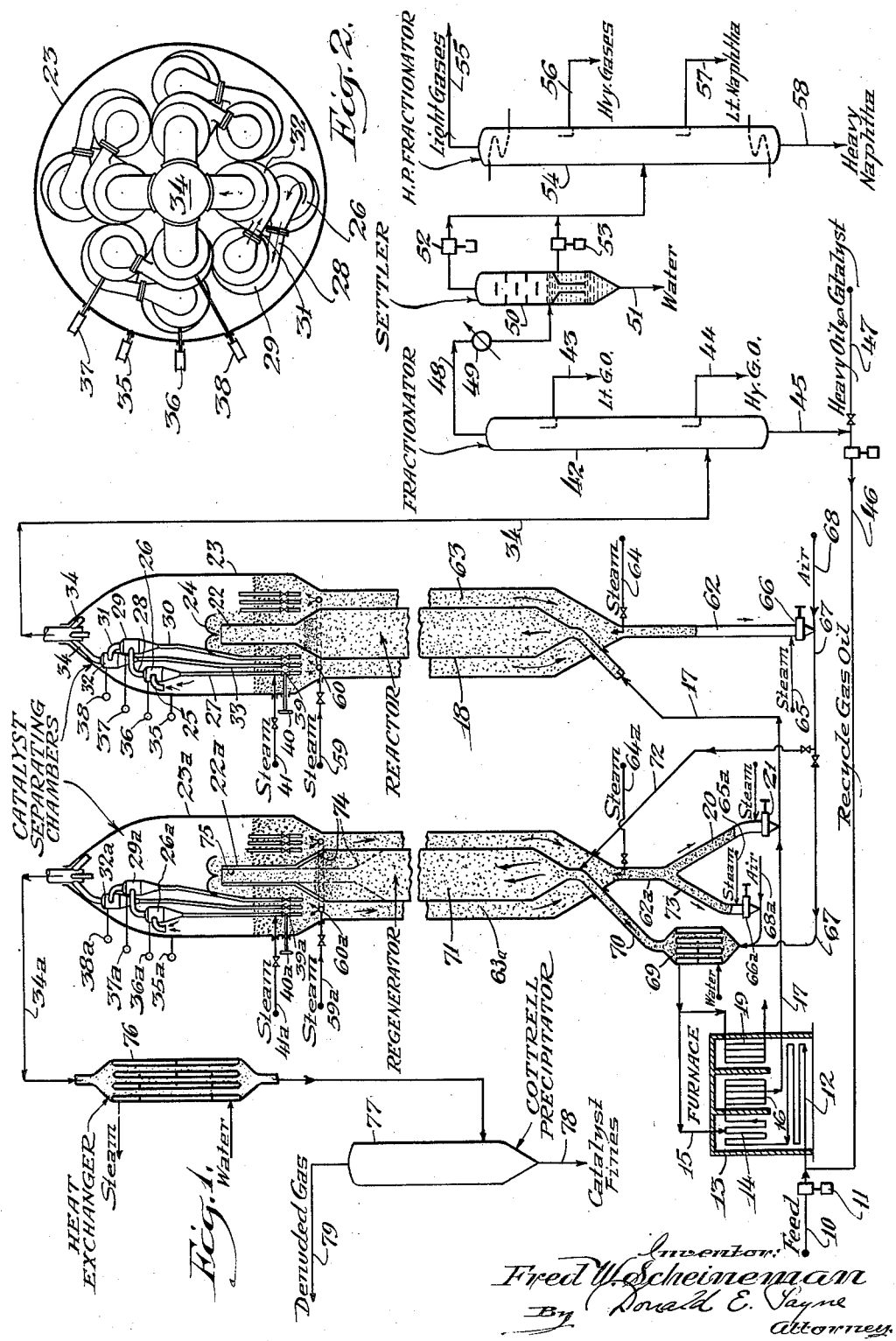
Inventor:
Fred W. Scheineman
By Donald E. Jayne
Attorney Dec. 28, 1943. F. W. SCHEINEMAN 2,337,684
SYSTEM FOR RECOVERING FINELY DIVIDED SOLIDS FROM GASES
Filed April 24, 1941 3 Sheets-Sheet 2

REMOVABLE CLOSURE OR PACKING BOX

Inventor:
Fred W. Scheineman
By Donald E. Payne
Attorney.

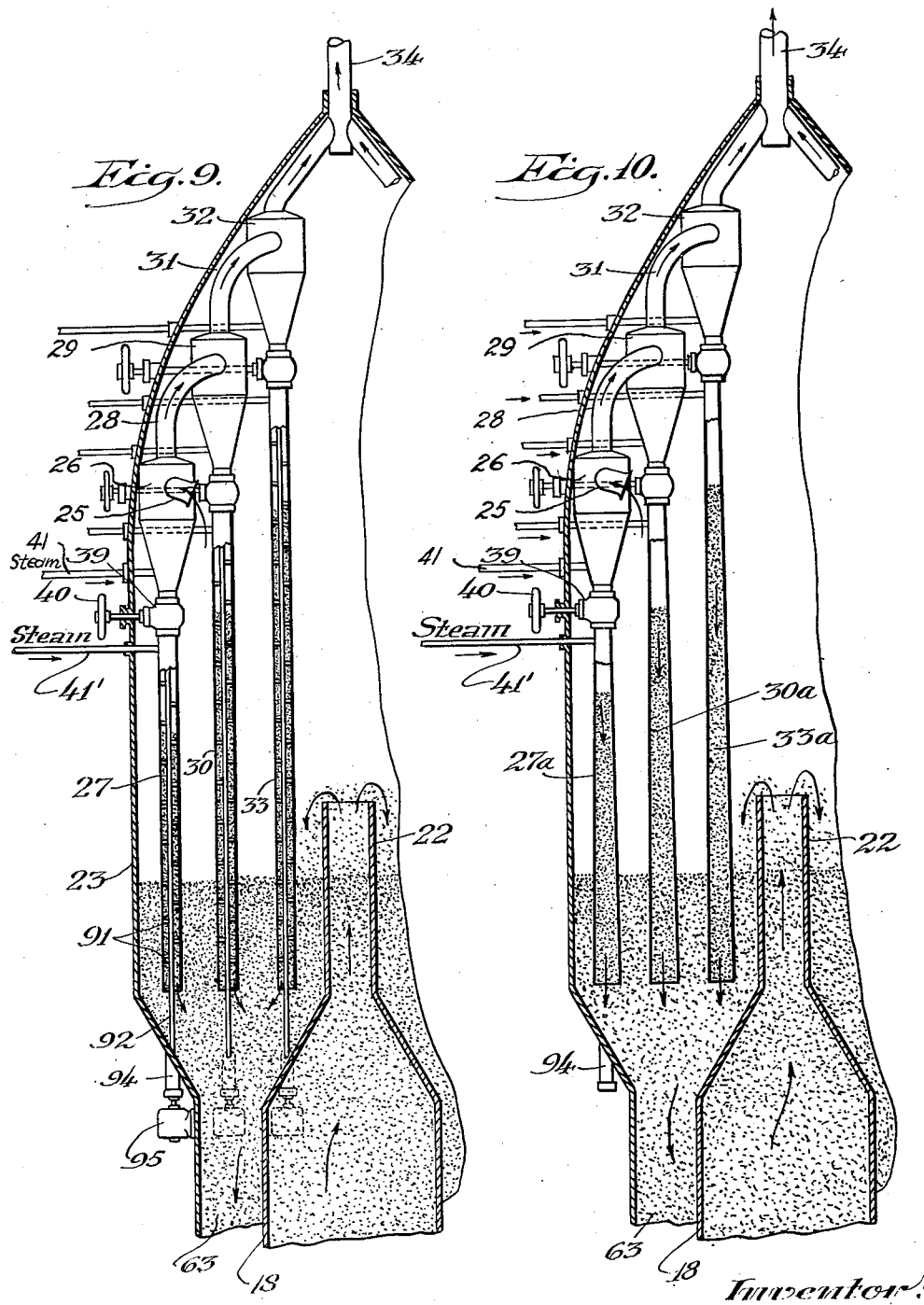

Patented Dec. 28, 1943

2,337,684

UNITED STATES PATENT OFFICE 2,337,684

SYSTEM FOR RECOVERING FINELY DIVIDED SOLIDS FROM GASES

Fred W. Scheineman, Chicago, Ill., assignor to Standard Oil Company, Chicago, Ill., a corporation of Indiana Application April 24, 1941, Serial No. 390,201

19 Claims. (Cl. 196—52)

This invention relates to improved systems for recovering any type of finely divided solids from any type of gases or vapors. The invention is particularly advantageous in hydrocarbon conversion systems employing powdered catalyst which is suspended in hydrocarbon gases or vapors for effecting conversion and subsequently suspended in regeneration gases for the combustion of carbonaceous material.

The powdered or fluid type catalytic hydrocarbon conversion system may employ a wide variety of catalysts, charging stocks, operating conditions, etc., for effecting hydrogenation, dehydrogenation, desulfurization, isomerization, reforming, alkylation, gas reversion, polymerization, synthesis, aromatization, isoforming, etc., but it is particularly applicable to the catalytic cracking of gas oils and heavier hydrocarbons for the production of high quality motor fuels.

In a powdered or fluid type catalyst system one of the most serious problems is that of effecting complete separation of the powdered catalyst from reaction product gases and vapors after the conversion step and effecting complete separation of regenerated catalyst from regeneration gases after carbonaceous material has been burned from the catalyst. Enormous amounts of catalyst must be handled by such systems and it is essential that extremely effective catalyst separation means be provided for minimizing catalyst losses. An object of my invention is to reduce the catalyst losses in such a conversion system to less than .01%.

A further object is to reduce the cost and simplify the operation of systems for separating finely divided solids from gases or vapors. A further object is to provide a new and improved arrangement of centrifugal or cyclone separators within a single separation chamber. A further object is to provide improved means for operating a multi-stage cyclone separator system, for automatically regulating the pressure differential across each stage, for insuring smooth and uniform flow of separated solids from each stage and for minimizing the number and size of pipes, hoppers, etc., and the necessary amount of apparatus required for accomplishing the desired separation.

A further object of the invention is to provide an improved combination of a reactor or a regenerator with catalyst separation, storage, and handling systems which will minimize fluctuations in operating conditions and at the same time be more simple and less expensive than systems heretofore employed for this purpose. Other objects of the invention will be apparent as the detailed description thereof proceeds.

While certain aspects of my invention are in no way limited to use in hydrocarbon conversion processes but are applicable to any system for separating finely divided solids from gases or fluids, I will describe a specific example of the invention as applied to a catalytic cracking system. In this system I superimpose a catalyst separation chamber over a reaction chamber or a regeneration chamber, or both. The major part of the catalyst separation in the superimposed chamber may be effected by settling or by centrifugal means, or both, so that the bulk of the solids are removed from the gases or vapors before they reach the upper part of the separation chamber.

In practicing my invention I provide a multi-stage cyclone system inside the separation chamber itself and at the upper part thereof. By placing the multi-stage cyclone system inside the enlarged separation chamber I effect marked economies in construction costs not only because of the extra piping, hoppers, supports, etc., that would be required for external mounting but because relatively thin walled cyclones can be used. If the cyclones were outside the separation chamber they would have to withstand full operating pressure but when they are mounted inside the separation chamber they need only withstand a pressure of about 1 or 2 pounds per square inch. By mounting the cyclones inside the separation chamber the dip legs from the cyclones may discharge directly into a common hopper and be sealed by an aerated mass of solids in said hopper.

An important feature of my invention is the maintenance in the hopper at the base of the separation chamber of a mass of aerated-solids which mass is of such density that it behaves like a liquid. One dip leg or set of dip legs extends from primary cyclones well below the surface of this dense liquid-like mass of aerated solids. Another dip leg or set of dip legs extends from the secondary cyclone or cyclones to a point well below the upper level of the fluent mass of aerated-solids. Still other dip legs or sets of dip legs may extend from a third cyclone stage, etc.

When the cyclones are geometrically and compactly arranged so as to substantially fill the upper part of the chamber, the dip legs from the center cyclones may have to be slightly inclined because of the center inlet pipe in the base of the separation chamber. I may avoid the use of inclined dip legs and avoid the use of any bends in dip legs by mounting the cyclones around the periphery of the separation chamber in which case each of the dip legs will be vertical and adjacent the outer wall of the separation chamber. With such an arrangement the valve in the dip leg may be at the upper part thereof and a mechanical stirrer may be employed in the lower part thereof, the shaft for the stirrer extending through a stuffing box in the laterally extending portion of the lower chamber wall to external driving means. Such mechanical stirrers may be employed in standpipes as well as in the cyclone separator dip legs.

Each dip leg may be slightly flared, i. e., be of slightly greater diameter at its bottom than at its top so as to prevent any tendency toward the bridging of solids therein. Each dip leg may also be provided with a valve and with a means immediately above or below said valve for aerating or blowing out solids which have accumulated in the dip leg. The proper functioning of each cyclone separator may be indicated by pressures in various parts of the system and if pressure differentials indicate that a particular cyclone is not properly functioning the dip leg associated therewith may be aerated or blown free of obstruction by external control means without interrupting continuous separation of the system and without the necessity of actually obtaining access to the cyclone separator.

The pressure differential between the various cyclones and the chamber in which they are enclosed is balanced by the head of settled solids in each dip leg. The level of the fluent settled solids in the primary cyclone dip legs will be lower than the level in the secondary cyclone dip legs and that level in turn will be lower than the level in the tertiary cyclone dip legs, etc.

For efficient operation the bulk of the solids should be separated from the gases or vapors in the enlarged chamber before these gases or vapors are passed through the multi-stage cyclone system. The suspended solids may be introduced through a vertical conduit against a baffle which is designed to deflect the solids downwardly and to permit upward flow of vapors. Alternatively the entering gases may be given a swirling motion in the conduit whereby solids are drawn toward the walls and one or more skimming devices may be employed along the vertical walls of the conduit for removing a considerable part of the solids from the gases before the gases are introduced into the enlarged chamber. A swirling of gases or vapors in the separation chamber itself should be avoided insofar as such swirling might stir up the separated solids in the base of said chamber.

The invention is particularly applicable to hydrocarbon conversion processes such as catalytic cracking in which case the solids may be finely divided or powdered catalyst particles and the separating chamber may be mounted above a reactor or regenerator. The reactor or regenerator may, in fact, be positioned in the base of the separator itself and construction costs may thus be minimized. Various other features of the invention will be apparent from the following detailed description of a specific embodiment thereof as applied to a catalytic cracking system.

In the accompanying drawings which form a part of this specification and wherein similar parts are designated by like reference Figure 1 is a schematic flow diagram of the catalytic cracking unit employing my improved separation system;

Figure 2 is a horizontal plan of the cyclones illustrated in Figure 1;

Figure 9 is a vertical elevation with parts of the apparatus removed to illustrate the arrangement of cyclones around the periphery of the settling chamber and the various catalyst heads in the dip legs.

Figure 10 is a vertical detail section illustrating flared dip leg to prevent catalyst bridging.

Figure 4:
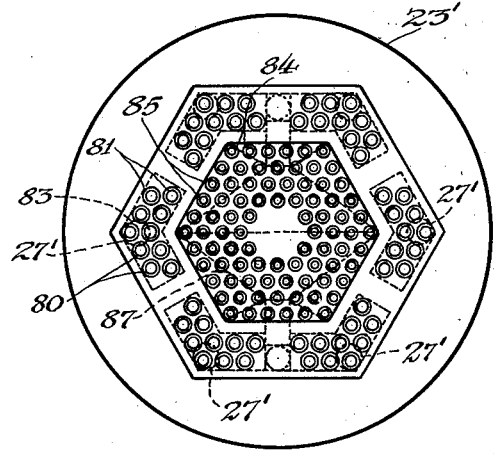
Figure 4 is a horizontal plan illustrating the type of cyclones shown in Figure 3.

To illustrate my invention I will describe a system for the catalytic cracking of gas oil or heavier hydrocarbons by means of a catalyst of the silica-alumina or silica-magnesia type. This catalyst may be prepared by the acid treating of natural clays, such as bentonite, or by synthetically preparing a silica-alumina or silica-magnesia mixture. An excellent catalyst may be prepared by ball-milling silica hydrogel with alumina or magnesia using about 2 to 30%, for example about 15 or 20%, of alumina or magnesia. The ball-milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonium hydroxide solution before washing, after which it is dried and heated as in the previous example. The silica-alumina catalyst may be rendered more stable at high temperatures by the addition thereto of zirconia in either smaller or larger amounts than alumina. The ball-milled silica-magnesia catalyst may be improved by pretreating the magnesia with a thorium nitrate solution so that the finished catalyst may, for instance, have the following composition:

| | Per cent |
|---|---|
| Silica | 66 |
| Magnesia | 27 |
| Thoria | 7 |

No invention is claimed in the composition or preparation of catalyst per se and no further description of the catalyst is, therefore, necessary.

The catalyst in this specific example is in powdered form with a particle size of about 10 to 100 microns, i. e., with about 50% of the catalyst passing a 400 mesh screen. The invention is applicable, however, to other catalyst sizes provided only that the catalyst be of such size and density that it may be aerated and handled as a fluid in the manner herein described. Higher gas or vapor velocities may be required for coarser catalyst particles, but these particles may be of such size as to be retained on a 400, 300, 200, 100, 50 or even 10 mesh screen.

The density of the catalyst particles per se may be as high as 160 pounds per cubic foot but the bulk density of catalyst which has settled for 5 or 10 minutes will usually be from 25 to 40 pounds per cubic foot. With slight aeration, i. e., with vapor velocities of about .05 to .5 foot per second, the bulk density of 300-400 mesh catalyst will be about 20 to 30 pounds per cubic foot. With vapor velocities of about 1 to 2 feet per second the bulk density of such catalyst may be about 10 to 20 pounds, for example, about 15 pounds to 18 pounds per cubic foot.

Gas oil feed stock from line 10 is introduced by pump 11 to convection coils 12 of pipe still 13. The preheated oil is then vaporized in radiant coils 14. Steam may be introduced in line 15 at this point to insure complete vaporization and I may employ a separator (not shown) for removing unvaporized oil from charging stock vapors. The vapors are then superheated in radiant coils 16 and introduced through transfer line 17 to the base of reactor 18. The transfer line temperature may be about 800 to 1050° F., for example about 900 to 925° F., as it leaves the furnace. The pressure at this point may be atmospheric to about 50 pounds per square inch, for example about 15 pounds per square inch. Steam may be superheated in radiant coils 19 to a temperature of about 800 to 1000° F., for example about 900° F. for supplying the process steam for aerating catalyst in the system and a part of this steam may be introduced into transfer line 17.

Regenerated catalyst from standpipe 20 is introduced by star feeder or slide valve 21 into transfer line 17 so that the weight ratio of catalyst-to-oil will be about 1:1 to 8:1, for example about 4:1 to 5:1. The pressure above the valve or star feeder 21 is sufficiently greater than the pressure in transfer line 17 to prevent any upward flow of charging stock vapors through the standpipe. The catalyst discharged through valve 21 is suspended in charging stock vapors and introduced thereby at the base of reactor 18.

The reactor may be a cylindrical chamber provided with a cone-shaped bottom and the reactor should be of sufficient cross-sectional area to give a vertical vapor velocity therethrough of about .4 to 4 or usually about 1½ to 2½ feet per second. In order to maintain the desired catalyst density in the reactor, process steam may be introduced in various amounts for increasing or decreasing vapor velocity in the reactor and the total amount of steam may range from about 2 to 20% by weight but is usually about 10% by weight based on stock charged. The reactor may be designed to provide a vapor contact time of about 10 to 20 seconds and a catalyst residence time in the reactor of about 1 to 10 or 20 minutes or more. The temperature in the reactor may be about 900 to 925° F. and the pressure about 8 to 15 pounds per square inch.

The reaction vapors carry suspended catalyst out of the reactor through conduit 22 into an enlarged separating chamber 23. A suitable baffle 24 may deflect the catalyst downwardly in the separating chamber. Such a baffle may consist of two hemi-cylinders arranged as shown in Figure 1 so that catalyst is deflected downwardly while vapors pass horizontally from the ends of the hemi-cylinders into the settling space in the separator chamber. The bulk of the catalyst may thus be separated from gases or vapors by this deflecting means and by settling so that when the gases and vapors reach the upper part of the chamber they may contain only about 400 grains of catalyst per cubic foot. The vertical vapor velocity in the settling chamber may be about .4 to 4 feet per second.

Within separation chamber 23 I provide a three-stage cyclone separation system with four sets of primary, secondary and tertiary cyclones respectively. A geometric arrangement of these cyclones is illustrated in Figure 2 from which it will be seen that I may accomplish a maximum utilization of space and a minimum amount of piping. Alternatively the cyclones may be peripherally disposed around the outer walls of the chamber so that all dip legs will be vertical and will be above the outwardly extending portion of the chamber bottom.

The inlet pipes 25 pick up the gases at substantially equally spaced points and introduce the gases tangentially into primary cyclones 26 imparting a swirling motion to the gases and throwing catalyst solids to the periphery of the cyclone. The catalyst is skimmed from such periphery by conventional means and conducted to dip leg 27 which extends to a point well below the level of settled catalyst in the chamber.

Gases from cyclone 26, which may contain about 80 grains of catalyst per cubic foot, are conducted by pipe 28 to secondary cyclone 29 from which separated catalyst is withdrawn through dip leg 30. Gases from the secondary cyclone, which gases may contain about 30 or 40 grains of catalyst per cubic foot, are conducted by pipe 31 to tertiary cyclone 32 from which catalyst is discharged through dip leg 33. Gases from the tertiary cyclone, which gases may contain about 10 or 20 grains of catalyst per cubic foot, may be withdrawn through discharge line 34 or may be passed through further cyclone separation stages or through an electrostatic precipitator or other separation means.

With a pressure of 8 pounds in chamber 23 the pressure in primary cyclone separator 26 may be about 7½ pounds, the pressure in secondary cyclone 28 may be about 7 pounds and the pressure in tertiary cyclone 32 may be about 6½ pounds per square inch. This pressure differential is maintained by the head of catalyst in the various dip legs. Thus the level of settled catalyst in dip leg 27 will be sufficiently higher than the level of settled catalyst in chamber 23 to provide a pressure differential of about ½ pound. The level in dip leg 30 will be sufficiently high to maintain a pressure differential of about 1 pound and the level in dip leg 33 will be sufficiently high to maintain a pressure differential of about 1½ pounds.

Each of the cyclones may be connected to a separate pressure gauge outside of the separator chamber, the pressure in the separator chamber being indicated by gauge 35, that in the primary cyclone by gauge 36, in the secondary cyclone by gauge 37 and in the tertiary cyclone by gauge 38. The readings on these pressure gauges will indicate whether or not the cyclones are properly functioning.

If any dip leg loses its pressure head of settled catalyst valve 39 may be closed by external operating means 40 until the desired catalyst levels have been re-established. If any dip leg becomes plugged with settled catalyst valve 39 may be closed and the dip leg may be blown free of catalyst by steam or other inert gas introduced through line 41. It should be understood of course that a similar steam line 41' may be provided immediately below the valve as well as immediately above the valve. Also, the valve may be mounted at the upper part of the dip leg instead of at the lower end thereof and the pressure differential in the dip leg established by the flow of fluent catalyst initially upwardly from the bottom of the dip leg. Various modifications and alternative arrangements will be apparent to those skilled in the art from the above description it being desirable that externally controlled means be provided for insuring the proper function of each of the several cyclone stages within the enlarged separation chamber. It should be understood that while the drawings have been somewhat simplified, each cyclone may be provided with its separate pressure indicator, dip leg, etc., and each dip leg provided with its separate valve closures, steam lines, etc.

The reaction products from line 34 may be fractionated in any conventional system but I prefer to separate the heavier-than-gasoline fractions at the relatively low pressure, then remove water and subsequently fractionate the lighter hydrocarbons at higher pressure. Thus the reaction products may be introduced into a low pressure fractionator 42 from which a light gas oil side stream may be withdrawn through line 43, a heavy gas oil fraction may be withdrawn through line 44 and a residual fraction containing small amounts of unremoved catalyst may be withdrawn from the bottom through line 45 and recycled through line 46 or withdrawn from the system through line 47.

The overhead from fractionator 42 may be passed through line 48, cooled in cooler 49, introduced into settler 50 from which condensed water may be withdrawn through line 51. The gases from this settler may be compressed by compressor 52 and the liquids pumped by pump 53 to a pressure of about 135 to 150 pounds per square inch and then fractionated in any suitable system or systems 54 from which light gases are withdrawn through line 55, a $C_3$—$C_4$ hydrocarbon fraction through line 56, light naphtha through line 57 and heavy naphtha or gasoline through line 58.

The spent catalyst from separating chamber 23 must be regenerated for further use but before regeneration it should be stripped with steam or inert gas for the recovery of hydrocarbons therefrom. This stripping may be effected by introducing process steam through line 59 to distributor 60 and the steam introduced through this distributor not only serves the function of removing reaction products from spent catalyst but it also serves to aerate the separated catalyst and maintain it in fluent condition. The stripped and aerated catalyst then passes to standpipe 62 which is of sufficient height to build up the necessary pressure for introducing this catalyst into the regeneration system.

Figure 1 illustrates a system wherein catalyst flows from the separating chamber around the reactor to the top of standpipe 62. The enlarged conduit 63 through which the spent catalyst flows may either be considered as the lower part of separating chamber 23 or the upper part of standpipe 62. By surrounding the reactor with separated catalyst in this manner I insure substantially uniform reactor wall temperatures since any radiation losses will be from the spent catalyst rather than from the reaction chamber, also the reaction chamber walls may be fabricated from less expensive steel. The thickness of the annular space between reactor 18 and chamber 63 may be relatively small and additional aeration steam may be introduced at the base of chamber 63 through line 64.

Instead of entirely surrounding the reactor by chamber 63 this chamber or the upper part of standpipe 62 may be an independent conduit adjacent the reactor or it may be an independent conduit extending downwardly through the reactor. Savings in construction costs as well as in heat losses may be effected, however, by utilizing at least a part of the reactor wall as a part of the standpipe wall in constructing both reactor and standpipe as an integral unit. The standpipe should be sufficiently tall to provide for the necessary catalyst head at its base, which in this example is about 20 pounds per square inch. The catalyst in the lower part of the standpipe is aerated by steam introduced through line 65.

Spent catalyst is discharged through valve or star feeder 66 into line 67 and picked up by air introduced through line 68 which conveys the catalyst through cooler 69 and line 70 to the base of regenerator 71. The spent catalyst, of course, may be introduced at the base of the regenerator directly through line 72. The regenerator and the separation system mounted above the regenerator are similar in design and operation to the reactor and the separation system above the reactor respectively so that no further description is required. The regenerator is designed to operate with vertical gas velocities of about .4 to 4 feet per second, usually about 1½ to 2½ feet per second and to provide for a catalyst residence time in the regenerator of about 5 or 10 minutes although the residence time will depend, of course, upon the amount of carbonaceous material that must be burned.

It is desirable to keep the regeneration temperature within the range of about 950 to 1050° F. for example about 1000° F., and it is hence necessary to abstract heat from the regeneration system. If the spent catalyst is cooled in heat exchanger 69 to a temperature of about 300 to 400° F., the heat of regeneration may be absorbed in the catalyst itself and utilized for raising the temperature of the catalyst to 1000° F. If it is desired to introduce catalyst to the regenerator at a higher temperature level I may recycle about 2 or 3 volumes of regenerated catalyst (per volume of spent catalyst undergoing regeneration) through leg 73 of standpipe 62a and cooler 69 by introducing a part of the air through line 68a. Thus where all of the spent catalyst is returned directly to the regenerator through line 72 I may recycle about three times that amount of regenerated catalyst through branch 73, through cooler 69 and cool it to a temperature of about 840° F. or lower so that the average temperature of catalyst introduced at the base of the regenerator will be about 850° F. or lower.

When three volumes of regenerated catalyst is recycled for each volume of spent catalyst introduced into the reactor the temperature increase may be only about 150° F. Without recycling the temperature increase may be about 600° F. In any case the actual temperature in the regenerator is substantially constant and uniform throughout, preferably at 1000° F. The regenerator volume may be effectively changed to provide for alternative methods of operation and to regulate the catalyst residence time in the regenerator by providing a false head 74 slidable in conduit 22a.

Any heat exchange fluid may be used in exchanger 69 but I prefer to use water and to generate steam by the heat absorbed from the hot spent or recycled catalyst. Additional steam may be generated by passing regeneration gases from line 34a through a down-flow heat exchanger 76 en route to Cottrell precipitator 77. Residual catalyst fines are removed in this Cottrell precipitator through line 78 and they may either be admixed with fresh or regenerated catalyst and returned to the hopper in the base of separating chamber 23a or they may be agglomerated or reworked in any way for the preparation of catalyst material of larger particle size. Catalyst free gases are withdrawn from the system through line 79.

Regenerated catalyst from the base of leg 20 of standpipe 62a may be at a temperature of about 980 to 1000° F. and when this catalyst is admixed with in-coming charging stock vapors, in the manner hereinabove described, it furnishes the bulk of the heat required for the endothermic catalyst cracking process.

Figure 3:
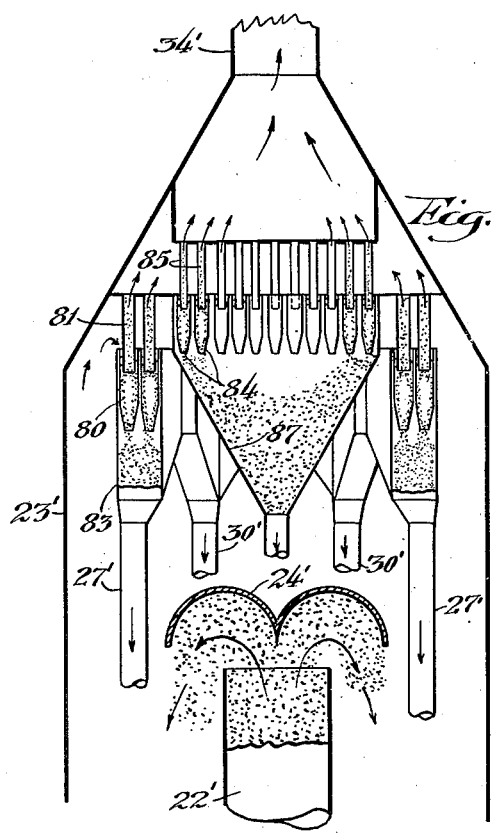
Figure 3 is a vertical plan of a separator employing a different type of cyclones.
Figure 5:
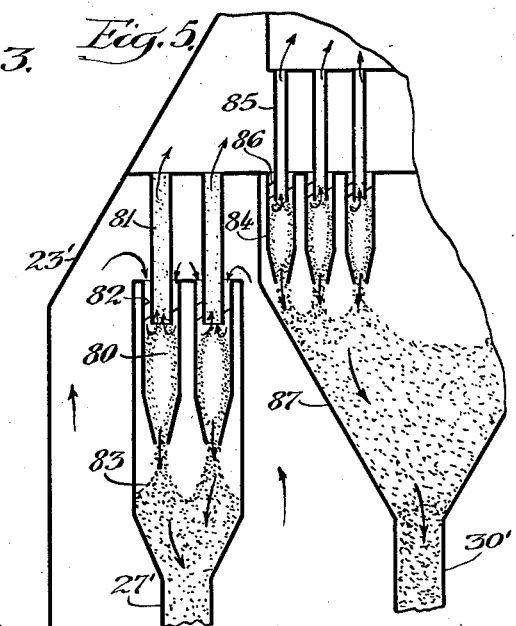
Figure 5 is a detail vertical section illustrating the operation of cyclones shown in Figures 3 and 4.

In the specific example hereinabove described, the cyclone separators were of the so-called Buell type wherein the swirling of the gases was effected by tangential introduction and wherein the catalyst was skimmed from the periphery of the swirling mixture. Other types of cyclone separators may, of course, be used and in Figures 3 to 5 I have illustrated the use of the so-called "multi-clone." In this modification the gases in the upper part of separator 23 pass downwardly between tubes 80 and 81 and are given a swirling in this annular space by vanes 82. Catalyst particles are thus thrown toward tube 80 and slide down the walls of this tube into collector chamber 83 which terminates in dip leg 27'. The gases from this primary stage of cyclone separation then pass upwardly through pipe 81 and downwardly through the space between pipes 84 and 85. Vanes 86 in the annular space between these pipes impart a swirling motion to the gases which throws out additional catalyst particles and the catalyst particles drop into collector 87 which terminates in dip legs 30'. The gases from this second cyclone stage may similarly be passed through any number of additional stages or may be withdrawn from the separation chamber through line 34'.

In this modification, as in the modification previously described, the dip legs will extend well below the surface of settled catalyst in the separator chamber and will be provided with valves, steam lines, pressure gauges, etc., for insuring continuous uniform and efficient catalyst separation. The Buell type and "multi-clone" type separators have been described for the purpose of illustrating the invention and any other types of cyclone separators may be employed in any number of stages.

Figure 8:
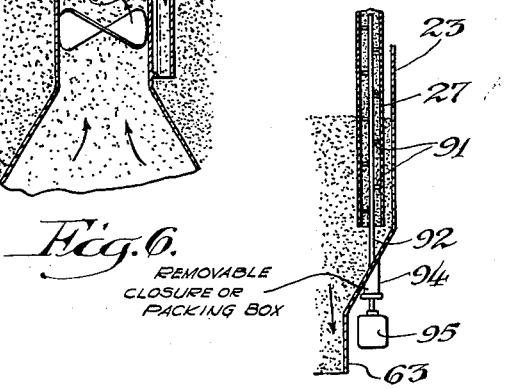
Figure 8 is a vertical detail section illustrating mechanical stirrers in peripheral dip legs.

When the straight dip legs extend to points above the outwardly extending portion of the lower wall of the settling chamber the provision of mechanical stirrers in the dip legs becomes a very simple matter. As illustrated in Figure 8, such stirrers 91 may be driven by a shaft 92 extending through a suitable packing box 94 in the outwardly extending portion of bottom wall and the shaft may be driven by a motor or other driving means 95. The stirrer should be rotated rather slowly, its purpose being to prevent bridging and to maintain the separated solids in fluent form. Similar means may be employed in the various standpipes hereinabove described for the same purpose. The packing box may be removably secured to the bottom wall and an opening in the bottom wall may thus be provided for inspection and cleaning of dip leg pipes. When mechanical stirrers are employed at the bottom of the dip legs, the valves therein will, of course, be positioned at the upper parts thereof.

Figure 6:
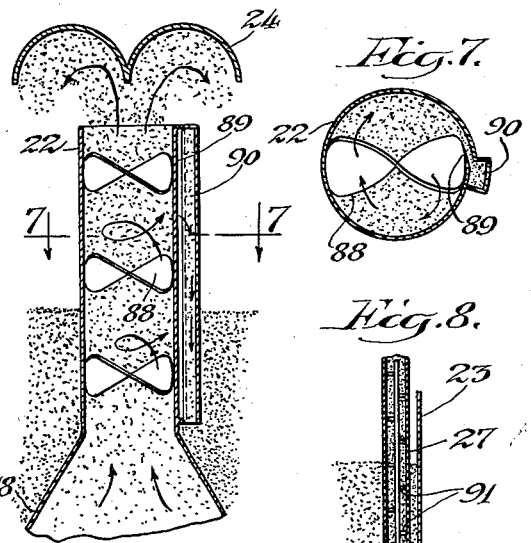
Figure 6 is a detail vertical section illustrating catalyst separation means at the periphery of the inlet pipe.
Figure 7:
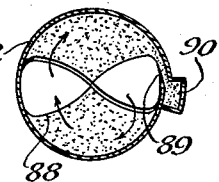
Figure 7 is a horizontal section through the inlet pipe illustrated in Figure 6.

I may augment preliminary separation of catalyst from vapors before these vapors are passed through the multi-stage cyclone system by imparting a swirling motion to the gases as they pass upwardly through conduit 22. Referring to Figures 6 and 7 I may employ a series of vanes 88 for imparting a swirling motion and I may skim catalyst from the periphery of the swirling gases by knife edge 89 and conduct the separated catalyst in conduit 90 to a point below the level of separated catalyst in chamber 23. It should be noted that such a centrifugal separation step is independent of the multi-stage cyclone separation system hereinabove described.

In Figure 9 I have illustrated an arrangement as hereinabove described wherein dip legs extend to points above the outwardly extending portion of the lower end of the settling chamber. In this figure I have shown stuffing boxes or removable closures 94 in the bottom walls below the dip legs and motor driven stirrers as illustrated in Figure 8. It will be noted that the level of settled solids in primary dip legs 27 is lower than the level in secondary dip legs 30 and that the level in dip legs 30 is lower than that in dip legs 33. Actually each of the dip legs may be substantially full of catalyst and the pressure differentials may result from the difference in dip leg lengths. Instead of being of uniform diameter these dip legs may be of gradually increasing diameter from top to bottom as illustrated in Figure 10.

The invention is not limited to the separation of catalyst from hydrocarbon vapors or regeneration gases but is applicable generally to the removal of finely divided solids from suspended gases or vapors. My invention is, therefore, not limited to the specific embodiments or to the specific details and separating conditions hereinabove described except as defined by the following claims.

I claim:

1. A system for separating finely divided solids from gases or vapors which system comprises an enlarged separation chamber, means for introducing gases or vapors together with suspended solids into said chamber, means for maintaining a layer of separated solids in the base of said chamber, a cyclone separator mounted inside of said chamber, means for introducing gases and vapors from the upper part of said chamber into said cyclone separator, a dip leg extending from said cyclone separator to a point below the level of said settled solids in said chamber said dip leg being of sufficient length to provide a settled solids head sufficient to balance the difference between the pressure in the settling chamber and the pressure in the cyclone separator and means for withdrawing gases and vapors from said cyclone separator to a point outside said chamber.

2. The apparatus of claim 1 which includes a secondary cyclone separator inside said separation chamber, means for passing gases from said primary cyclone through said secondary cyclone and a dip leg from said secondary cyclone extending to a point below the level of settled solids in said chamber said dip leg being of such length that the head of settled solids in said second dip leg balances the difference between the pressure in the secondary cyclone and the pressure in said chamber.

3. The apparatus of claim 1 which includes a secondary cyclone and a tertiary cyclone in said separation chamber, means for introducing gases from the primary cyclone to the secondary cyclone and from the secondary cyclone to the tertiary cyclone, and dip legs from both of said secondary and tertiary cyclones extending to a point below the level of settled solids in said chamber, each of said dip legs being of such length that the head of settled solids therein will balance the pressure differential between the cyclone from which it extends and the space within the separation chamber.

4. In a system for separating solids from gases a large separation chamber of sufficient cross-sectional area for permitting the settling of solids and the formation of a layer of fluent settled solids in the base of the chamber, a multi-stage cyclone separation system inside of said chamber, dip legs from each stage of said multi-stage system extending to a point below the level of settled solids in said chamber, means for removing gases from said multi-stage cyclone system to a point outside of said chamber, and means including an element extending from each of the dip legs to a point outside of said chamber for controlling the operation of the multi-stage cyclone separator.

5. The apparatus of claim 4 wherein the means for controlling the operation of the multi-stage cyclone separator include externally controlled valves in said dip legs and external means for introducing a pressuring gas into said dip legs adjacent said valves.

6. The apparatus of claim 4 wherein the means for controlling the operation of the multi-stage cyclone separator include stirrers in said dip legs and means outside of said chamber for driving said stirrers.

7. The apparatus of claim 1 wherein said dip legs are flared outwardly at their bases to prevent the bridging of separated solids.

8. A system for separating suspended powder from a suspending gas which system comprises an enlarged settling chamber, means for introducing a gas and a finely divided powder into said chamber, whereby suspended powder and a body of fluent settled powder may be maintained therein, primary and secondary cyclone separators in said chamber above the body of fluent settled powder, means for passing gases from said settling chamber into said primary cyclone and for passing gases from said primary cyclone to said secondary cyclone, dip legs extending from the cyclone separators into said body of settled fluent powder said secondary cyclone being mounted at a higher elevation than the primary cyclone so that the catalyst head in its dip leg may be greater than the catalyst head in the dip leg of the primary cyclone and means for removing fluent powder directly from the body thereof to a point outside of said chamber.

9. In a fluid type catalyst system wherein the powdered catalyst effects conversion while suspended in hydrocarbon vapors, is then separated from the hydrocarbon vapors and suspended in a gas mixture for regeneration and is then separated from the regeneration gas and returned for further conversion, the improved system for separating catalyst from gases or vapors which system comprises an up-flow catalyst chamber, a settling chamber superimposed above the up-flow catalyst chamber in which settling chamber a layer of settled catalyst may accumulate, a multi-stage cyclone separator inside said settling chamber, an inlet for the first stage of said cyclone separator in the upper part of said settling chamber, means for passing gases from said first stage to a succeeding stage of said cyclone separator and dip legs extending from each stage of the cyclone separator to a point below the level of settled catalyst in said settling chamber.

10. In a catalytic conversion system an up-flow regenerator, an enlarged catalyst separation system including multi-stage cyclone separators superimposed above said regenerator, a standpipe communicating with said separation system, a reactor chamber, a spent catalyst separation system including a multi-stage cyclone separator superimposed above said reactor, a spent catalyst standpipe communicating with said last named separator, means for introducing spent catalyst from the base of said spent catalyst standpipe to the base of said regenerator, means for introducing regenerated catalyst from the base of said first named standpipe into said reactor, a catalyst cooler and means for recycling regenerated catalyst from said first named standpipe through said cooler and back to said regenerator.

11. A system for separating solids from gases which comprises a separation chamber provided with outwardly extending bottom walls, a conduit for introducing a mixture of gases and solids upwardly into said chamber and so disposed that the space between the conduit and the chamber walls provides a hopper for separated solids, a plurality of cyclone separators mounted inside of said chamber and around the periphery thereof, substantially straight dip legs extending from said cyclone separators to points adjacent the outwardly extending bottom walls, and removable closures in said bottom walls below said dip legs.

12. A system for separating solids from gases which comprises a separation chamber provided with outwardly extending bottom walls, a conduit for introducing a mixture of gases and solids upwardly into said chamber and so disposed that the space between the conduit and the chamber walls provides a hopper for separated solids, a plurality of cyclone separators mounted inside of said chamber and around the periphery thereof, substantially straight dip legs extending from said cyclone separators to points adjacent the outwardly extending bottom walls, stirrers in said dip legs, shafts for said stirrers extending through said outwardly extending bottom walls, and means outside of said bottom walls for driving said stirrers.

13. In a fluid-type catalyst system wherein a powdered catalyst effects a conversion while suspended in hydrocarbon vapors, is then separated from the hydrocarbon vapors and suspended in a gas mixture for regeneration and is then separated from the regeneration gas and returned for further conversion, an upflow catalyst chamber, an enlarged settling chamber superimposed above said upflow chamber, a standpipe for removing settled catalyst from said settling chamber, the upper part of said standpipe being integrally associated with the upflow catalyst chamber by having a common wall, the upflow chamber being on one side of said wall and the standpipe being on the other side of said wall, a cyclone separator mounted within the enlarged catalyst settling chamber, and a dip leg extending from said cyclone separator to a point below the upper level of said settled catalyst.

14. In a fluid type catalyst system wherein a powdered catalyst effects a conversion while suspended in hydrocarbon vapors, is then separated from the hydrocarbon vapors and suspended in a gas mixture for regeneration and is then separated from the regeneration gas and returned for further conversion, the improved system for separating catalyst from gases or vapors which system comprises an up-flow catalyst chamber, a catalyst settling chamber superimposed above said catalyst chamber, wherein catalyst may settle to form a body of settled catalyst, a cyclone separator inside the settling chamber, an inlet for said separator in the upper part of said settling chamber, a dip leg from said separator extending into the body of settled catalyst, said dip leg being of sufficient length to provide a settled catalyst head sufficient to balance the difference between the pressure in the settling chamber and the pressure in the cyclone separator.

15. The system defined by claim 14 which includes a valve in said dip leg, means extending outside of said settling chamber for operating said valve and means for introducing aeration steam above said valve.

16. In a system for separating suspended solids from a suspending gas, an enlarged settling chamber, a cyclone separator enclosed in said settling chamber, a dip leg extending from said cyclone separator substantially to the base of said settling chamber so that it extends below the level of settled solids in said chamber, an inlet leading from the upper space in said chamber to said cyclone separator, means for removing gases from the cyclone separator to a point outside of said settling chamber, a valve in said dip leg, external operating means for opening and closing said valve, and means for introducing an aerating gas into said dip leg immediately above said valve.

17. The apparatus of claim 16 which also includes means for introducing an aerating gas into said dip leg at a point immediately below said valve.

18. A system for separating a suspended powder from a suspending gas which system comprises an enlarged settling chamber, a plurality of cyclone separators arranged in the upper part of said settling chamber for obtaining maximum utilization of space therein, uniformly spaced inlets for withdrawing gases at a plurality of points from the upper part of the settling chamber into the cyclone separators, means for discharging gases from said cyclone separators to a point outside of said settling chamber, dip legs extending from said cyclone separators to a point adjacent the base of said settling chamber whereby the lower ends of the dip legs may be sealed by settled solids and means for aerating the settled solids and centrifugally separated solids in said settling chamber.

19. The system of claim 1 which includes means for continuously removing solids at a point below the level of settled solids in said chamber and means for introducing an aerating gas adjacent the bottom of said chamber whereby the settled solids may be admixed with solids from said dip leg and maintained in fluent form for continuous removal.

FRED W. SCHEINEMAN.